(12) United States Patent
Logan et al.

(10) Patent No.: US 8,720,352 B2
(45) Date of Patent: May 13, 2014

(54) APPARATUS FOR HILL PLOT FARMING OF CEREAL GRAIN CROPS

(75) Inventors: James David Logan, Pullman, WA (US); Richard Wayne Lloyd, Lewiston, ID (US); Wayne Lucas McProud, Moscow, ID (US)

(73) Assignee: HPFM Drill Co., LLC, Pullman, WA (US)

( * ) Notice: Subject to any disclaimer, the term of this patent is extended or adjusted under 35 U.S.C. 154(b) by 272 days.

(21) Appl. No.: 12/931,847

(22) Filed: Feb. 9, 2011

(65) Prior Publication Data

US 2011/0192330 A1    Aug. 11, 2011

Related U.S. Application Data

(60) Provisional application No. 61/337,941, filed on Feb. 11, 2010.

(51) Int. Cl.
   *A01C 7/00*    (2006.01)
(52) U.S. Cl.
   USPC ........... 111/167; 111/178; 111/184; 111/193; 111/195
(58) Field of Classification Search
   USPC ......... 111/170–185, 149, 157, 163, 164, 167, 111/190–195
   See application file for complete search history.

(56) References Cited

U.S. PATENT DOCUMENTS

| | | |
|---|---|---|
| 534,361 A | 2/1895 | Courtney |
| 844,932 A | 2/1907 | Grooters |
| 1,381,235 A | 2/1920 | Bristow |
| 3,077,290 A | 2/1963 | Rehder |
| 3,156,201 A | 11/1964 | Tweedale |
| 3,162,153 A | 12/1964 | Schulz |
| 3,329,310 A | 7/1967 | Ramsay |
| 3,572,547 A | 3/1971 | Walberg |
| 3,982,661 A | 9/1976 | Feltrop |
| 4,023,509 A | 5/1977 | Hanson |
| 4,047,638 A | 9/1977 | Harrer |
| 4,061,094 A | 12/1977 | Cary et al. |
| 4,074,830 A | 2/1978 | Adams |
| 4,091,964 A | 5/1978 | Harrer |
| 4,148,414 A | 4/1979 | Parks, Jr. |
| 4,239,126 A | 12/1980 | Dobson et al. |
| 4,241,849 A | 12/1980 | Harrer |
| 4,265,368 A | 5/1981 | Feltrop |
| 4,300,462 A | 11/1981 | Wilkins et al. |
| 4,399,757 A | 8/1983 | Maury |

(Continued)

OTHER PUBLICATIONS

John C. Baker, and Keith Saxton, "No-tillage seeding in conservation agriculture", Cabi Publishing, Food and Agriculture Organization of the United Nations, Edition 2, illustrated, 2007, ISBN 1845931165, 9781845931162. Figure 4.30 pp. 56-59.

(Continued)

*Primary Examiner* — Christopher J Novosad (57) ABSTRACT

This improved apparatus for planting grain crops provides improved emergence, particularly under heavy soil conditions, promotes more vigorous growth, reduces tillering and improves the yield in wheat and barley crops. The improved apparatus receives seed at a more-or-less uniform rate, captures the flow of seed until a multiplicity of seed generally in the range of 20 to 30 seeds is gathered, then releases seed in concentrated groups spaced apart from one another and with blank or non-seeded portions therebetween into a furrow prepared by an angled disk.

17 Claims, 7 Drawing Sheets

(56) References Cited

U.S. PATENT DOCUMENTS

| | | |
|---|---|---|
| 4,449,642 A | 5/1984 | Dooley |
| 4,450,979 A | 5/1984 | Deckler |
| 4,461,225 A | 7/1984 | Patrick |
| 4,650,093 A | 3/1987 | Meyer-Bosse |
| 5,535,917 A | 7/1996 | Ribouleau |
| 6,044,779 A | 4/2000 | Brown et al. |
| 6,109,193 A | 8/2000 | Crabb et al. |
| 6,173,664 B1 | 1/2001 | Heimbuch |
| 6,325,005 B1 | 12/2001 | Crabb et al. |
| 6,374,759 B1 | 4/2002 | Crabb et al. |
| 6,401,638 B1 | 6/2002 | Crabb et al. |
| 6,481,647 B1 | 11/2002 | Keaton et al. |
| 6,564,730 B2 | 5/2003 | Crabb et al. |
| 6,681,706 B2 | 1/2004 | Sauder et al. |
| 6,739,272 B2 | 5/2004 | Crabb et al. |
| 6,742,465 B2 | 6/2004 | Crabb et al. |
| 6,748,885 B2 | 6/2004 | Sauder et al. |
| 6,776,108 B2 | 8/2004 | Crabb et al. |
| 7,152,542 B2 | 12/2006 | Eben et al. |
| 7,228,807 B1 | 6/2007 | VenHuizen |
| 7,455,019 B2 | 11/2008 | Spooner |
| 2002/0088383 A1* | 7/2002 | Barry et al. .................. 111/181 |
| 2007/0193482 A1 | 8/2007 | Spooner |
| 2010/0131095 A1 | 5/2010 | Zielke |

OTHER PUBLICATIONS

Doerr, Ted B., Press Seeder and Punch Seeder, Section 8.4.4 US Army Corps of Engineers Wildlife Resources Management Manual, Technical Report EL-86-49 Department of the Army Waterways Experiment Station, Corps of Engineers, PO Box 631 Vicksburg MI 39180-0632 pp. 4-7.

Lawrence, M. J., D. R. Buckmaster, and W. J. Lamont, Jr. A pneumatic dibbling machine for plastic mulch, Applid Engineering in Agriculture, American Society of Agricultural and Biological Engineers, ISSN 0883-8542, vol. 23(4): 419-424, pp. 419-421.

\* cited by examiner

APPARATUS FOR HILL PLOT FARMING OF CEREAL GRAIN CROPS

CROSS-REFERENCE TO RELATED APPLICATIONS

1. Apparatus for Hill Plot Farming of Cereal Grain Crops Provisional application filed Feb. 11, 2010 Application No. 61/337,941
2. Hill Plot Farming Method for Small Grains, PCT/US09/68337. EFS ID 6654758

BACKGROUND OF THE INVENTION

This invention relates to planting cereal grain crops including but not limited to wheat and barley, and more specifically to a method and apparatus for planting said cereal grain crops such that colony growth attributes are enhanced whereby crop reliability and yield improvement may be achieved.

IMPORTANCE OF THE INVENTION AND PRIOR ART

The wheat and barley grain crops are essential nutrients for the human race with vast numbers of people dependent upon reliable supply of these grains for sustenance. In many countries between 40 and 60 percent of all daily calories consumed by humans are from wheat.

Vast resources have been devoted to the improvement of the art whereby greater yields of grains may be obtained from the arable lands available. This invention opens new paths to yield improvement in its contrarian approach. Whereas the prior art is replete with methods involving the principle of producing a seed row wherein the seeds are placed singly and uniformly spaced apart from one another, in this invention the seed are gathered into small concentrated groups, or hill plots. When planted in the manner disclosed in this invention, the individual plants working together can break through a deeper overburden thereby allowing the seed row to be planted deeper where it is better protected from moisture fluctuations. By working in concert the plants can break through a crusted-over calcareous soil whereas an individually planted young plant may fail to break through, thereby leading to crop failure.

The present invention, applied in concert with Patent Application no. PCT/US09/68337, EFS ID 6654758 by inventors Wayne Lucas McProud and Gene Elbert McProud, Hill Plot Farming Method for Cereal Grains, comprises a method for selective breeding of cereal grains and a method of planting that implements the hill plot farming method. The present invention provides the apparatus for mechanization and implementation of said Hill Plot Farming Method for Cereal Grains. The mechanization is the final necessary component in the Hill Plot Farming Method, without which it is not practical to make use of said Hill Plot Farming Method.

The production of cereal grain crops dates back into antiquity and has been traced back as far as 9,000 BC, in which seed was hand-broadcast over a tilled field in a more or less uniform distribution so the plants grew as individuals with minimal competition from neighboring plants. Conventional farming practices from early beginnings to the present continued this practice with seeds sown in uniformly-spaced arrays or rows to evenly divide the soil area with the plant population whereby the crops are grown as individual plants.

An alternative seeding method is a hill plot culture in which multiple seeds are placed in the same bed or hold or hill causing the crop to grow as a colony of plants in the field environment as opposed to the conventional practice of planting seeds singly so plants grow as individuals in the field environment.

Hill plot culture methods are utilized in a breeding program to select plants with superior growth attributes in a colony culture environment, and to replicate the same colony culture environment on a field-wide basis as a preferred planting method whereby grain yields are improved.

BRIEF SUMMARY OF THE INVENTION

This invention relates to the method and apparatus for planting seeds specifically selected for their colony growth attributes, and a preferred embodiment of apparatus whereby the colony growth environment may be expanded to large field production.

DEFINITIONS

In the subsequent description and figures, like elements are identified with like reference numerals. The use of "e.g.,", "etc," and "or" indicates non-exclusive alternatives without limitation unless otherwise noted. The use of "including" means "including, but limited to," unless otherwise noted.

BRIEF DESCRIPTION OF THE SEVERAL VIEWS OF THE DRAWING

The drawings are presented as a series of figures (FIGs) disbursed in the text with brief descriptions shown as captions to the figures.

DETAILED DESCRIPTION OF THE INVENTION

A Preferred Embodiment of the Present Invention is Described as Follows.

In a seed planting apparatus utilizing an opener disk set at an angle to the direction of travel in an apparatus that is capable of travelling at a ground speed over ground to be planted, a distributor plate is attached thereto on the trailing or downstream side so that the said distributor plate rotates with said opener disk. Said distributor plate is shaped with a plurality of seed pockets in the side opposite attachment to said opener disk for receiving a plurality of seeds as the pocket rotates toward the upper portion of its rotation, then as the distributor plate continues to rotate, it carries the plurality of seed to a downward position over a furrow opened by the opener disk, at which point the seeds are released into said furrow. In a preferred embodiment said plurality of seed is a number of seed generally in the range of 20 to 30. While this range of average seed numbers has been found suitable in certain circumstances it should be noted that the apparatus disclosed is capable of a range extending from about 3 to about 100 seeds per group depending upon seed size. A fixed second plate is slidably arranged to cover said distributor plate pockets, provide an opening through which seed may enter said distributor plate in proximity to the top of rotation, hold the seeds in place until the seed pocket rotates to a downward position then release the seed into the furrow.

DETAILED DESCRIPTION OF THE PREFERRED EMBODIMENT

One preferred embodiment of this invention is shown in FIGS. 1-5. Opener disk 25 is rotatably attached to a machine frame by means of a wheel hub (not shown). Bolts extend through distributor plate 4 and opener disk connecting said distributor plate and opener disk to the rotatable hub. Opener disk 6 is fabricated of steel with a thickness of approximately ¼ inch, with a sharp outer periphery 8, a pilot hole 10 at the center to fit a pilot on hub (not shown), and a hole pattern 12 that matches the hole pattern in the hub. Distributor plate 4 in one preferred embodiment is machined from aluminum, and has an outer diameter 14 of approximately 11 inches, a beveled outer edge 16 forming the frustum of a right circular cone, an inner bore 18 that fits a pilot on the hub (not shown), and a hole pattern 20 that matches the hole pattern in the hub and disk, a flange portion the inner bore 22 of which matches the outer diameter of the hub, and the outer diameter of which 24 matches the inner bore 2 of the cover plate with sufficient clearance that thermal expansion in the cover plate will not close up said clearance in the coldest operating conditions. In one preferred embodiment the distributor plate outer edge 16 is beveled at an angle of 45 degrees matching the inner bevel of the cover plate 28. Distributor plate includes seed pockets 30 which receive seed when they rotate into position under filler tube 32, attached to and made a part of cover plate. Cover plate 26 is held in position by fit on hub of distributor plate 24 and outer periphery angle of distributor plate 16, and by spring loading means (not shown). Cover plate is prevented from rotation by linkage attachment to machine frame (not shown). Seed exits seed pockets in distributor plate as the seed pockets 30 pass by lower slot in cover plate 34.

Figure 1:
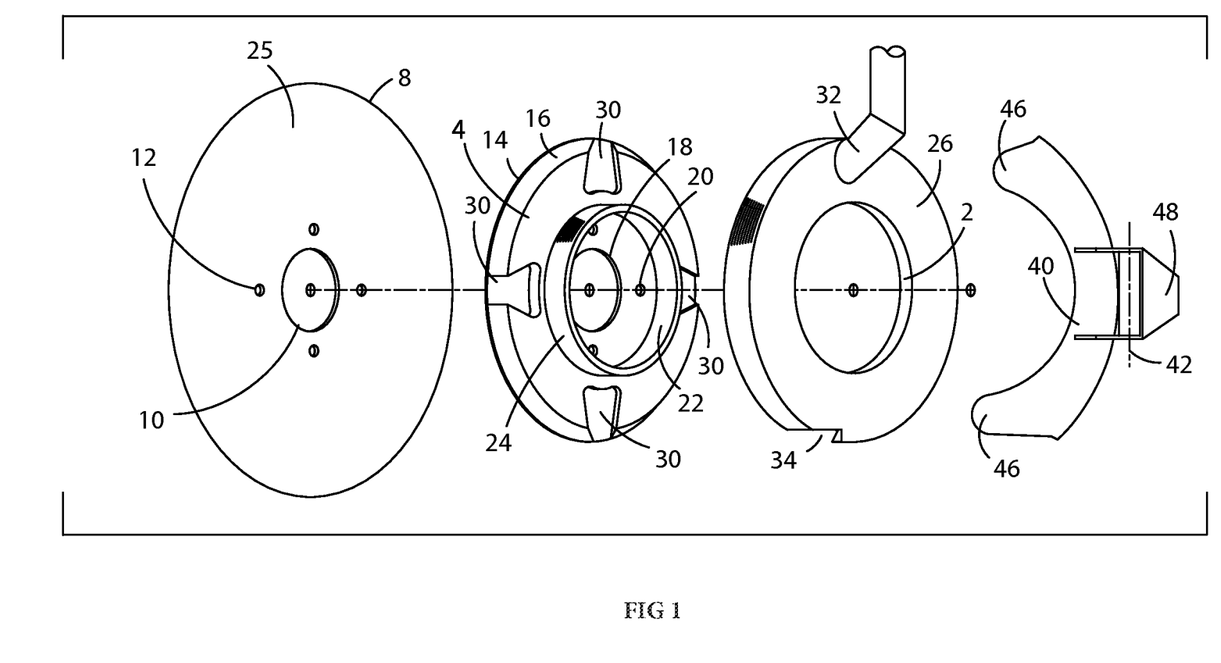
FIG. 1 shows an exploded view of the components of the present invention and their approximate juxtaposition with rotating disk and distributor plate, and stationary cover plate and yoke.
Figure 2:
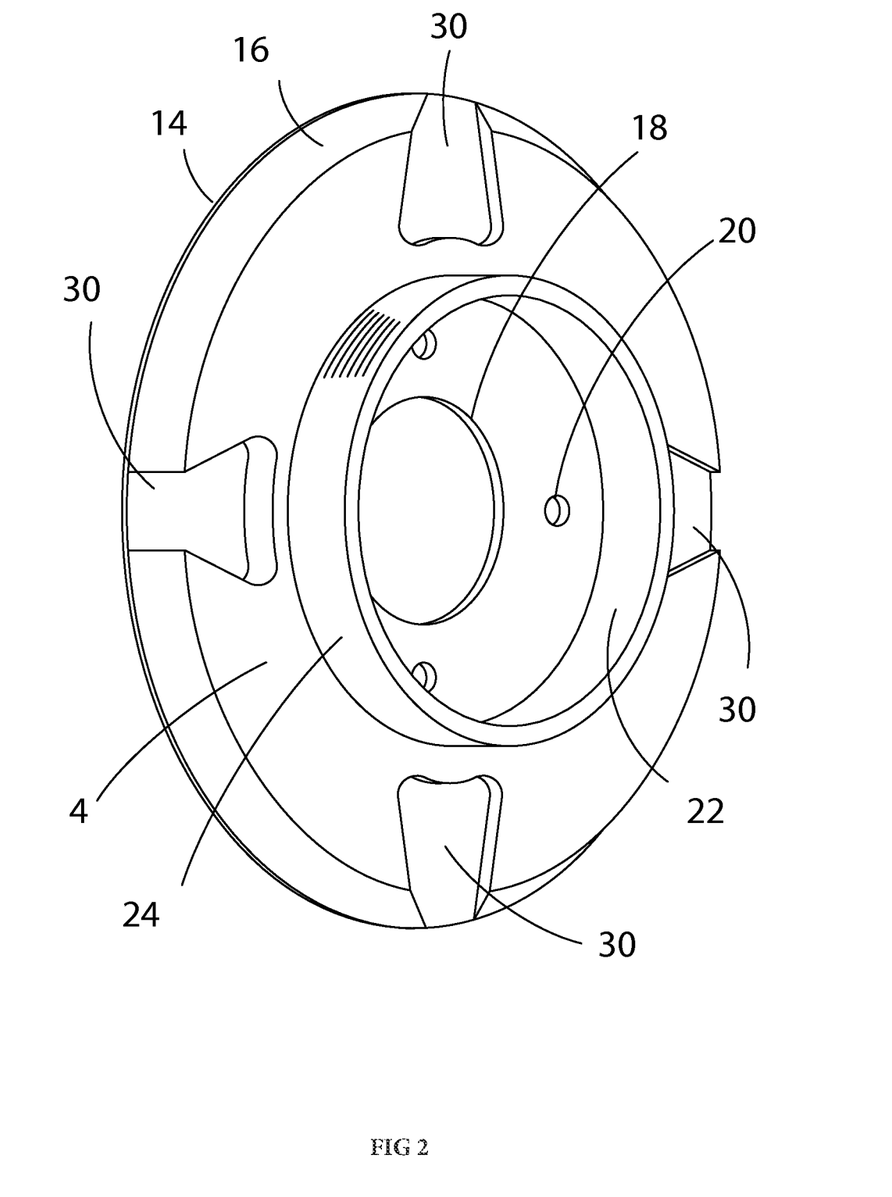
FIG. 2 shows the detail of the distributor plate of the present invention
Figure 3:
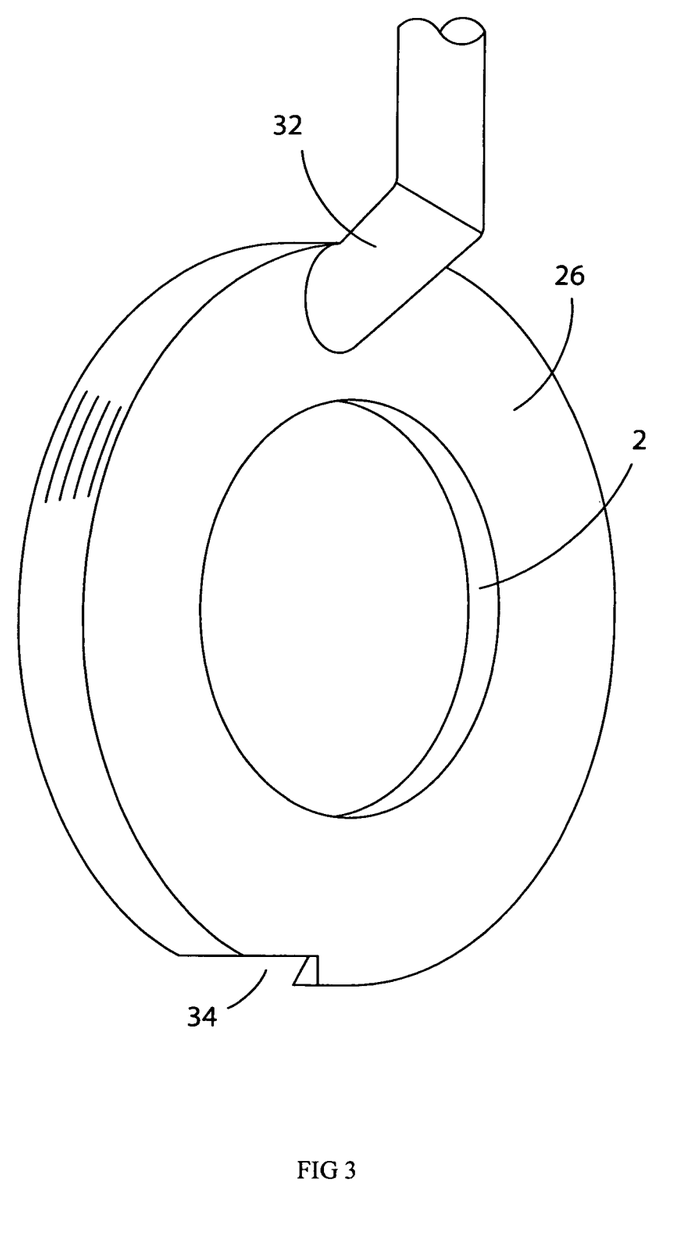
FIG. 3 shows the detail of the cover plate of the present invention
Figure 4:
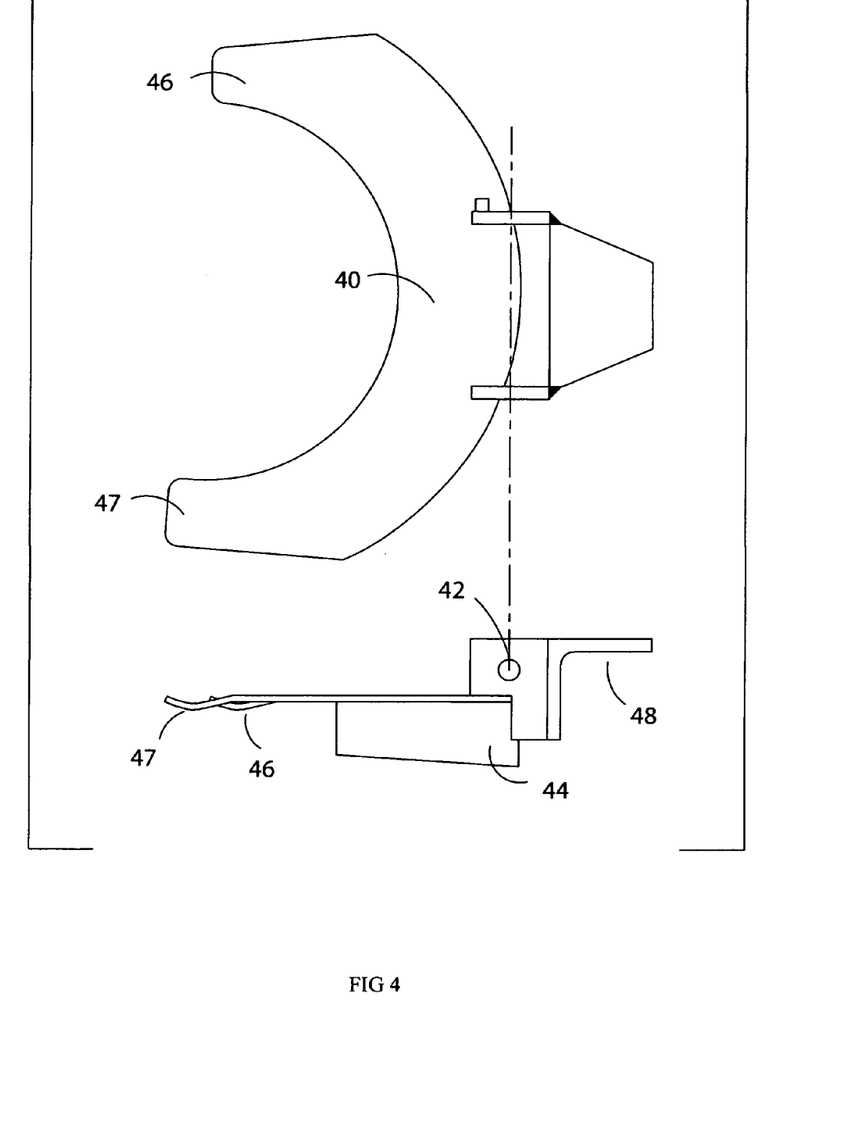
FIG. 4 shows the detail of the yoke and guard of the present invention

Guard cover and Yoke 40 fits over the cover plate 34, and is pivotably fastened to the machine frame by means of a hinge pin through a hinge point 42. A forward guard portion 44 prevents contact between cover plate and soil, and yoke means 46 contacts the cover plate top and bottom 34 urging it toward the distributor plate 4. Spring means connected through a lever arm contacts the cover guard at flange 48 whereby a small force is applied to urge the yoke arms into contact with the cover plate 34. In one preferred embodiment the guard cover and yoke are manufactured from mild steel parts laser cut and welded to form the preferred shape.

Figure 5:
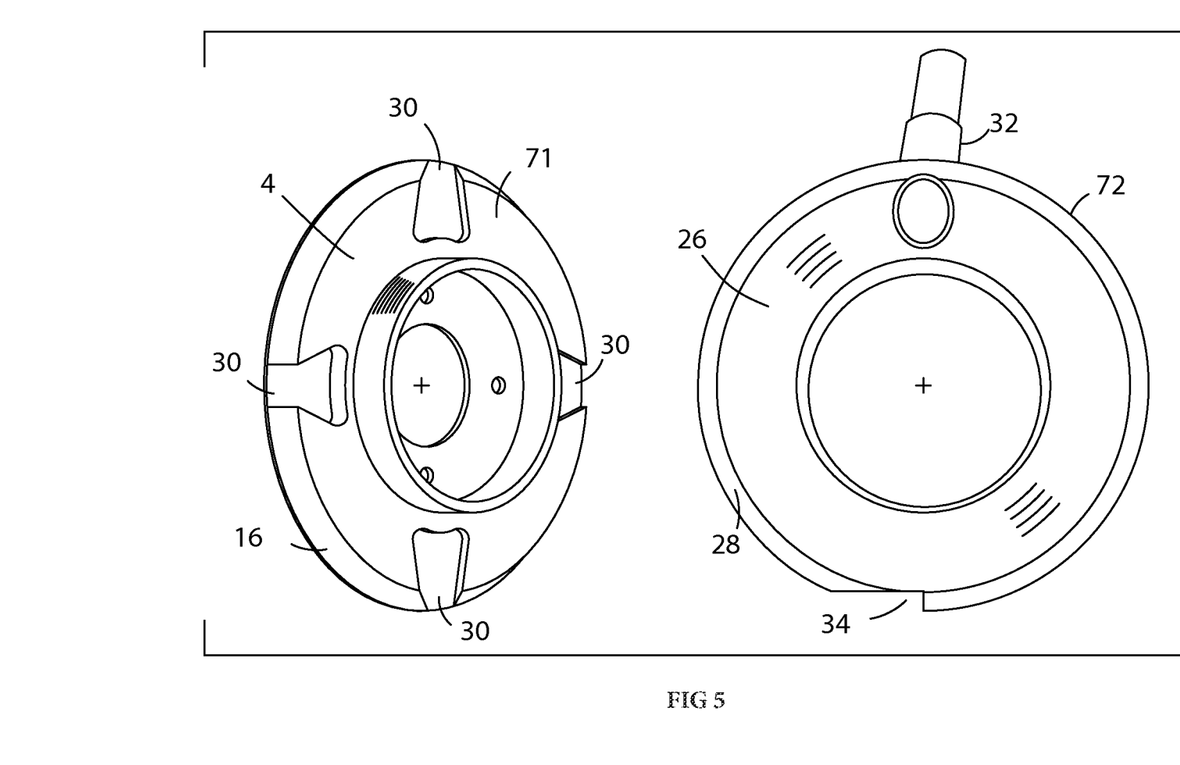
FIG. 5 shows a prototype single-row seeding machine utilizing the teachings of the present invention

As shown in FIG. 5, distributor plate 71 and cover plate 72 parts are shown with the contact surfaces showing. The aluminum distributor plate with beveled outer periphery 16 and seed pockets 30 is attached to and rotates with the opener disk and hub. The non-rotating cover plate 72 is held in contact with distributor plate 71 by spring loaded yoke means. The feed tube 32 is 1¼ inch PVC pipe, shown here with a 45-degree elbow and a short nipple attached. It was later determined that the short nipple could be eliminated, and the feed tubing connected directly to the 45 degree elbow. In one preferred embodiment the cover plate 72 is made of ultra-high molecular weight (UHMW) polyethylene plastic and the distributor plate 71 is made of 6061 aluminum alloy.

Figure 6:
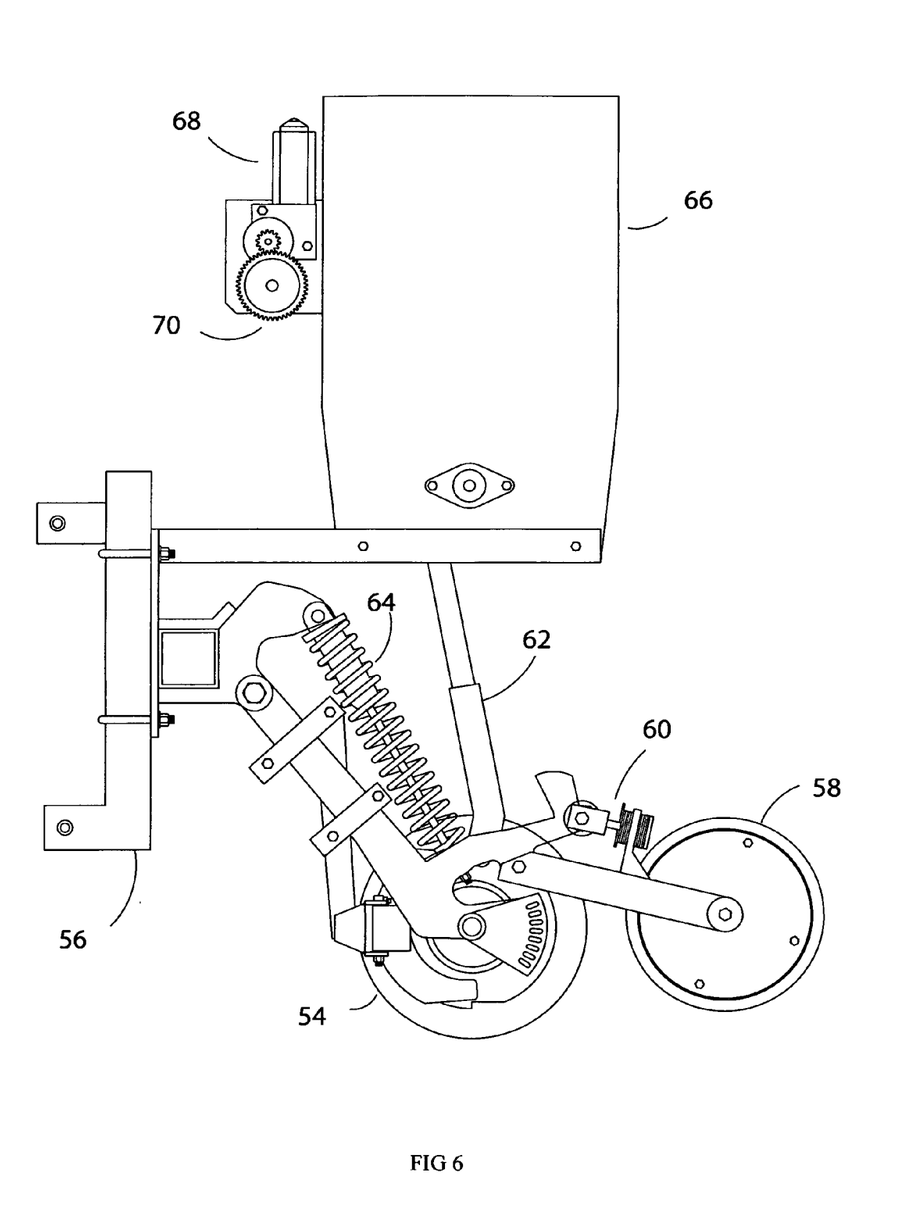
FIG. 6 shows the mating surfaces of the distributor plate and cover plate of the present invention.

FIG. 6 is a photograph showing a prototype single-row mechanism that was used as a proof of concept testing platform. This single row prototype is mounted on a 3-point hitch 56 with an experimental seed bin 66 and delivery mechanism driven by an electric motor 68 operating through a gear set 70 and a chain drive (not shown) to drive a seed dispensing means (not shown). Seed is delivered at a more-or-less uniform rate through convoluted tubing 62 into a cover plate port. The distributor rotor then collects the seed in seed pockets, carries them in groups to a point above the furrow produced by the opener disk 54 where they are dropped into the furrow and subsequently covered by the packer wheel 58. Packer wheel suspension 60 includes planting depth adjustment. The basic mechanism for mounting the planter disk hub, and suspending it from the square box tubing is a modified part manufactured by Deere and Company.

Figure 7:
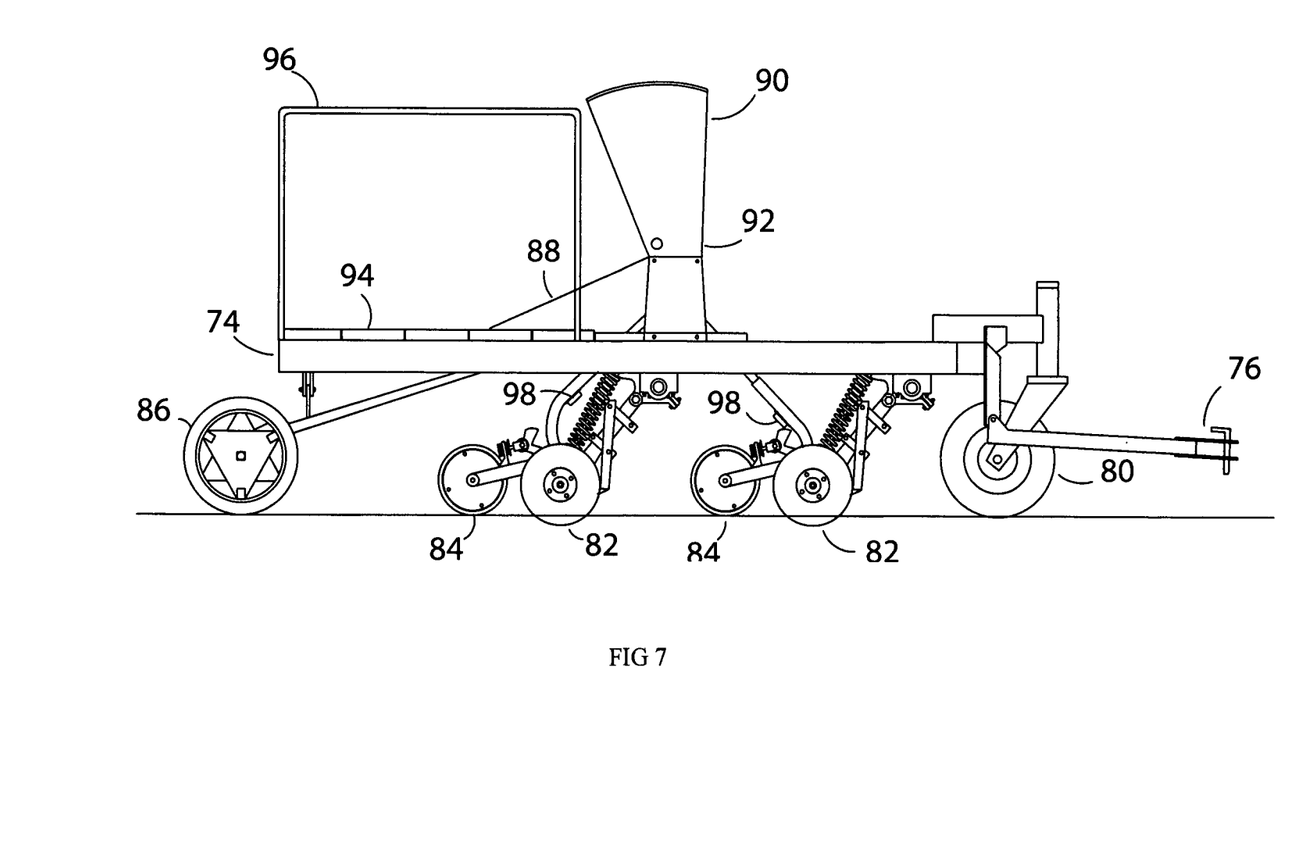
FIG. 7 shows an 8-row Hill Plot Farming Method planter set up for performing test plot planting.

FIG. 7 shows a prototype multiple row seeding machine arranged to be towed behind a tractor over a seed bed, including a yoke hitch 76 pivotably connected about a horizontal axis to a frame-end hitch point means and providing clearance around a caster-mounted front wheel means 78 whereby said multiple row seeding machine may be connected to a towing tractor for purposes of providing mobility over a seed bed.

A frame means 74 provides rigid mounting arrangement for the various components including opener assemblies 82 arranged in two ranks of four openers each whereby surface debris may pass therebetween, a seed bin 90 with eight seed dispensers 92 driven by a drive train 88 including a selective sprocket ratio from rear packer wheels 86, said drive train allowing for decoupling when seed dispensing is not desired. Said seed dispensers including an adjustable orifice whereby seed flow may be selected to a desired seeding rate. Said opener assemblies each including the preferred seed dispensing means shown in FIGS. 1-5.

Two horizontal rocker shafts 80 rotatably mounted with bearing means at the ends thereof to said frame means upon which said opener assemblies are mounted, which rocker shafts may be rotated by a hydraulic cylinder means acting through bell cranks and linkage means to selectively raise or lower said opener assemblies into engagement with the ground. Said rocker shafts are fabricated of square steel tubing with round shafts welded in the ends to fit bearing means.

Forward rank openers are arranged at a preferred spacing of 24 inches. Rearward rank openers are set at a side-to-side spacing of 24 inches, and located between forward rank openers whereby a row-to-row spacing is at a preferred distance of 12 inches.

An operator deck 94 shown partially assembled upon which operators may access adjustments and seed bin for managing the operation of the multiple row seeding machine.

A guard rail 96, not shown, surrounds the operator deck area for safety of operator personnel.

An electronic flow monitor 98 manufactured by Metriguard Inc., of Pullman Wash., with sensors in each of the eight flow tubes whereby a flow stoppage from either a plug-up or empty seed bin will alarm operators of improper operation.

Seed furrows are closed by means of individual depth control wheels 84 adjustably attached to the individual openers, and by eight packer wheels 86 located at the rear of the machine frame and spaced apart by a distance of 12 inches between centers and aligned with seed rows; said packer wheels rotatably attached thereto by a "double-bogey" suspension whereby each wheel in a group of two carries one-eighth of the total weight carried by all the packer wheels, and each group of four wheels carries one-half the total weight carried by all the packer wheels. The suspension system allows for individual wheels to follow the ground contour while maintaining the preferred equal distribution of load.

Seed is metered into the apparatus by means of conventional seed metering devices at a steady or more or less uniform rate. Seed passes downward into the apparatus in which a rotating distributor is attached to an opener disk so that the disk and distributor rotate at the same speed, or at a speed that is proportional to the ground speed. A sliding cover is mounted on a compliant fixture such that it is held under more or less constant force against the distributor and prevented from rotation. The sliding cover is prevented from moving vertically or laterally by its shape which engages a center hub on the distributor and an outer angled flange of the distributor. Seed is directed into slots on the distributor through an opening in the siding cover which connects by means of a rigid tubing means to flexible tubing means which in turn is connected to the seed metering apparatus. A multiplicity of slots in the distributor are arranged in a polar array about the face of the distributor by means of which seed may enter from the top, become trapped in the distributor slot and then be released as the distributor plate rotates the slot to a downward position at which there is a notch or opening in the sliding cover which allows the collected seed to be dropped into the trench produced by the opener disk.

In a preferred embodiment four seed pockets are placed in the distributor. The opener disk has an outer diameter of approximately 16 inches, and an effective rolling radius of approximately 15.28 inches, thereby placing groups of seed at 12 inches centers along the seed row.

Research work to date has been limited to seed colony spacing of 12 inches; however it is recognized that larger or smaller spacing may also be advantageous. Other spacing may be obtained by varying the opener disk diameter and the number of slots in the distributor.

It is important that between seed colonies there be no seed, such that the plants will grow as a colony rather than as individual seed. The apparatus of the preferred embodiment provides this feature by the arrangement of seed slots in the distributor with openings at the periphery of about one inch width, whereby all the seed in a seed pocket are released at approximately the same time, within close proximity to the bottom of the furrow and at reduced forward velocity such that bouncing of the seed in the seed trench is reduced.

Seed pockets in the distributor are arranged to be relatively wide in the area where seed is introduced from the seed metering means and narrow at the point of release.

In a preferred embodiment the seeding furrow is opened by means of an angled rotating disk blade, to which is attached the distributor plate in an arrangement that places the seed in the furrow at or slightly behind the rolling axis of the opener disk whereby the seeding operation may be carried on at speeds in the neighborhood of 5 miles per hour. In a preferred embodiment wherein a multiplicity of opener assemblies are used, said opener assemblies are arranged in pairs of left-hand and right-hand configurations whereby the furrows are either to the left or right of the opener disk in respect of the line of travel, and whereby the lateral forces from left-hand openers are balanced by the lateral forces from right-hand openers.

Features and Advantages of the Present Invention and Comparison with the Prior Art Farming methods have been developed over the entire recorded history of mankind, and a number of notable inventions have been introduced with noble purpose of feeding a hungry population. The so-called "conventional wisdom" approach to cereal grain planting has been to produce a uniformly spaced seed row in which the seed are displaced one from another at equal distances. The method of the present invention is contrary to such conventional wisdom. A number of apparatuses have been invented the purpose of which is to place small numbers of seed in groups spaced apart from one another. We will describe all known inventions of this type and point out the differences from them that make the present invention unique and non-obvious. One example is a punch planting arrangement described by Baker, C. John, and Keith E. Saxton, "No-tillage seeding in conservation agriculture", Cabi Publishing, Food and Agriculture Organization of the United Nations, Edition 2, illustrated, 2007, ISBN1845931165, 9781845931162, Page 56-57.

Punch Planting

Punch planters make discrete holes into which one or more seeds are placed before moving on to the next hole. Ancient farmers used pointed sticks to make the holes because there was insufficient energy to make continuous slots and utilize the convenience of continuous flow of seed and fertilizer into them.

Modern engineering has attempted to mechanize punch planting so that it can be performed with less human labour and with greater accuracy and speed. The devices created have mostly consisted of steel wheels with split spikes attached to their rims. The split spies are hinged at their bases so that they can be forced to open in much the same way as a bird's beak. FIG. 4.30 shows an example of a prototype punch planter.

In operation, the opening and closing functions are actuated by an internal cam and synchronized with a seed dispenser. After each spike has become fully embedded in the soil, a single seed or small group of seeds is directed from the dispenser tube, located at the centre of the wheel, through an hole in the rim of the wheel into the opened spike and deposited in the soil at a controlled depth and spacing from its neighbours.

Mechanized punch planters were seen as sensible solutions to mechanizing an ancient practice. Their relative mechanical complexity, however, has prevented their widespread adoption to date. The creation of V-shaped holes has all the biological disadvantages of continuous V-shaped slots. This includes the tucking (hairpining) of residues into the holes, difficulty in closing the holes and the wedging action of the spies, which compacts soil under and alongside the seed zone.

The Present Invention

In contrast, the present invention avoids the problems of punch planting methods by utilizing an angled opener disk, and placing the seed in a continuous furrow, arranged in the preferred seed colony cluster arrangement, said seed colonies separated therebetween by unseeded zones as described in the preferred embodiment of the present invention. The punch planting apparatus described by Baker et al is limited in its speed of operation to very slow speed to avoid dynamically tossing the seed and soil out of the punched holes, whereas the present invention may be operated at grounds speeds in the neighborhood of 5 miles per hour [135 m/min] while achieving the same seed placement performance as operation at dead creep. The present invention is inherently rugged construction with the ground engaging part comprising a single steel disk rotatably attached to a heavy machine frame whereby it may engage a very wide variety of soil conditions and survive encounter with rocks and sticks that may lie in the seeding path. The apparatus described by Baker and Saxton would not be suitable for implementing the purposes of the present invention.

Other seeding devices, such as those used for seeding corn provide for placing one or two seeds in spaced apart groups. Again, the mechanism of such planting devices is not suitable for small grains, and will not place small grain seeds in the preferred arrangement in the seed row.

Further narrative may be included describing the differences between the present invention and other prior art without adding to the disclosure of the present invention.

Apparatus

The exemplary embodiments shown in the figures and described above illustrate but do not limit the invention. In compliance with the statute, the invention has been described in language more or less specific as to structural features. It is to be understood, however, that the invention is not limited to the specified features shown, because the means and construction herein disclosed comprise a preferred form of putting the invention into effect. The invention is, therefore, claimed in any of its forms or modifications within the proper scope of the appended claims appropriately interpreted in accordance with the doctrine of equivalents.

The invention claimed is:

1. An apparatus for planting seeds in groups for hill plot farming, said groups having a group length and a distance between said groups that is a group spacing, operably connected to a farming implement whereby motive power is provided to move said farming implement at a velocity through a field and including;
   a. a soil opener means whereby a seed furrow is opened in soil, and;
   b. a seed distributor plate means with an axis of rotation that is substantially horizontal and including a number of seed pockets indented into an outer surface of said seed distributor plate means with said seed pockets sized to hold a plurality of seeds, and;
   c. a rotational drive means whereby said seed distributor plate means is caused to rotate about said axis of rotation at a rotational rate, and;
   d. a non-rotating cover means with an inner surface shaped to fit said outer surface of said seed distributor plate means, said non-rotating cover means including a seed entry opening and a seed exit opening, said seed exit opening located above a bottom of said seed furrow, and;
   e. a retention means whereby said non-rotating cover means is held in sliding contact with said seed distributor plate means, and;
   f. a soil closer means,
   whereby a substantially equally-spaced flow of seeds is directed into each of said seed pockets at said seed entry opening thereby being aggregated as a preferred average number of seeds and retained as said plurality of seeds while said seed distributor plate means rotates and moves each of said seed pockets to said seed exit opening and said plurality of seeds flows as said group from each of said seed pockets and is deposited into said bottom of said seed furrow to form a group colony, with said group spacing between said groups and with no seeds between said groups within said group spacing and said seed furrow is covered with soil by said soil closer means.

2. The apparatus of claim 1 in which said rotational rate is proportional to said velocity through a field whereby said group spacing is maintained over a range of said velocities.

3. The apparatus of claim 1 wherein
   a. said soil opener means is a disk means rotatably attached to a tool bar of said farming implement, said disk means with an axis of rotation perpendicular to a plane of rotation, said plane of rotation set at an angle to a direction of travel of said farming implement, and;
   b. said disk means having a diameter and an upstream side, and;
   c. said disk means having a portion of its outer periphery set below the top of soil in an operating position, and;
   d. said disk means having a downstream side, and;
   e. said seed distributor plate means is fastened to said disk means on said downstream side with said axis of rotation of said seed distributor plate means arranged collinear with said axis of rotation of said disk means;
   whereby said disk means pushes soil aside and opens said seed furrow in soil to a depth.

4. The apparatus of claim 3 wherein said seed distributor plate means is fastened to and rotates with said disk means.

5. The apparatus of claim 3 wherein said seed distributor plate means is rotatably fastened to said disk means and is driven by a separate means at said rotational rate.

6. The apparatus of claim 3 in which said diameter of said disk means is in the range of 12 to 24 inches and said number of said seed pockets in said distributor plate means is in the range of 1 to 10, giving said group spacing in the range of 3.8 to 75 inches.

7. The apparatus of claim 3 in which said diameter of said disk means is approximately 16 inches and said number of said seed pockets in said distributor plate means is four, producing said group spacing of approximately 12 inches.

8. The apparatus of claim 1 including a center hub means whereby said non-rotating cover means is prevented from vertical or lateral displacement with respect to said axis of rotation of said seed distributor plate means.

9. The apparatus of claim 1 in which said retention means includes a guard and yoke means pivotably attached to said farming implement by a hinge means whereby said seed distributor plate means and said non-rotating cover means are protected from contact with foreign objects.

10. The apparatus of claim 1 in which said retention means includes a spring means whereby said spring means holds said non-rotating cover means in contact with said distributor plate means preventing seeds from escaping from said seed pockets when said seed pockets are between said seed entry opening and said seed exit opening, and allows said seed distributor plate means to rotate with low frictional forces, and frictional heat and wear in said seed distributor plate means and said non-rotating cover means are held at acceptable levels.

11. The apparatus claim 10 in which said spring means allows a range of motion of said non-rotating cover means whereby said non-rotating cover means may move away from direct contact with said seed distributor plate means to allow an overload of seeds to be cleared by rotation of said seed distributor plate means.

12. The apparatus of claim 1 in which said seed distributor plate means includes an external outer conical portion with said seed pockets extending to the surface of said external outer conical portion of said seed distributor plate means and said non-rotating cover means includes a matching internal conical portion with said seed exit opening located in said matching internal conical portion of said non-rotating cover means whereby seeds are caused to drop vertically from said seed pocket into said seed furrow.

13. The apparatus of claim 1 in which said seed distributor plate means includes an external outer cylindrical portion with said seed pockets extending to the surface of said external outer cylindrical portion and said non-rotating cover means includes matching internal cylindrical portion with said seed exit opening located in said internal cylindrical portion of said non-rotating cover means whereby seeds are caused to drop vertically from said seed pocket into said seed furrow.

14. The apparatus of claim 1 wherein said substantially equal-spaced flow of seeds is provided by conventional seed dispensing means and rate of said substantially equal-spaced flow of seeds is adjusted whereby said preferred average number of seeds is in the range of 3 to 100.

15. The apparatus of claim 1 wherein the number of said seed pockets in said seed distributor plate means and said rotational rate of said seed distributor plate means results in said groups being placed in said seed furrow at said group spacing of 5 to 60 inches.

16. The apparatus of claim 1 wherein said outer surface of said seed distributor plate means that intercepts said seed pockets is planar, cylindrical or conical in any combination, whereby said non-rotating cover means will allow rotation of said seed distributor plate means with respect to said non-rotating cover means while maintaining fit between said seed distributor plate means and said non-rotating cover means and seeds are prevented from exiting said seed pockets between said seed entry opening and said seed exit opening.

17. The apparatus of claim 1 in which said rotational rate of said seed distributor plate means is established so that a peripheral velocity of said seed distributor plate means at said seed exit opening is matched to said velocity through a field whereby seeds at said seed exit opening are moving at a zero velocity with respect to said bottom of said seed furrow and dispersion of seed along said seed furrow is reduced.

* * * * *